(Model.)
N. DRUCKER.
CASTER.
No. 344,728. Patented June 29, 1886.
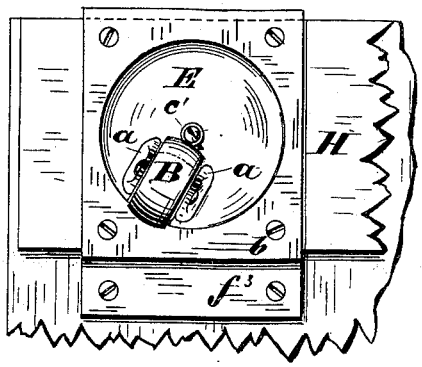
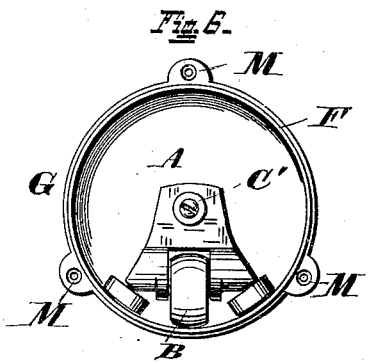
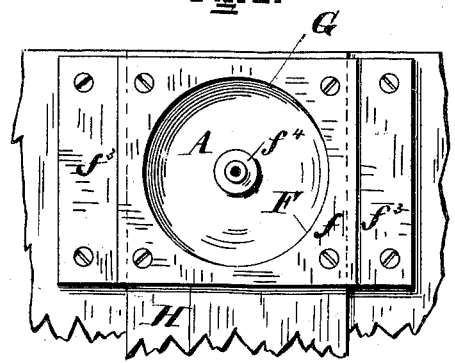
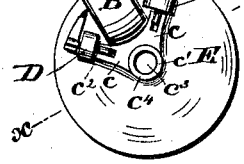
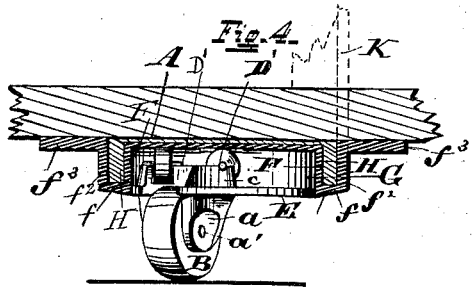
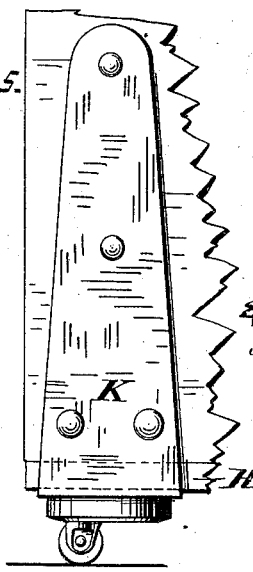
Attest: Jno. W. Strehli
O. M. Hill
Inventor
Nathan Drucker
per Wm. Hubbell Fisher,
Atty
N. PETERS, Photo-Lithographer, Washington, D. C.

UNITED STATES PATENT OFFICE.

NATHAN DRUCKER, OF CINCINNATI, OHIO.

CASTER.

SPECIFICATION forming part of Letters Patent No. 344,728, dated June 29, 1886.

Application filed August 14, 1884. Serial No. 140,582. (Model.)

*To all whom it may concern:*

Be it known that I, NATHAN DRUCKER, a resident of Cincinnati, Hamilton county, and State of Ohio, have invented certain new and useful Improvements in Casters, of which the following is a specification.

While my invention relates particularly to casters for trunks, it is applicable to various other forms of casters, and especially for casters for use on various pieces of furniture.

The especial advantages of my caster are its compactness, and especially its ease of movement. Its great strength must also be mentioned, as this is a feature of no small importance with reference to casters.

The several features of my invention, and the various advantages resulting from their use conjointly or otherwise, will be apparent from the following description and claims.

Figure 1 is a bottom view of a caster, illustrating certain features of my invention, the caster being shown attached to a trunk-strip and to the trunk. Fig. 2 is a bottom view of the same device with the caster proper removed, leaving only the caster-case, and showing the case provided with an additional flange connected to the trunk. Fig. 3 represents a view of the top side caster proper—that is, it is the other side of the caster from that shown in Fig. 1. Fig. 4 represents a side elevation of the caster proper, and a central vertical section of the caster-case, and of a preferred means for connecting (when desired) the caster to the strip and to the side of the trunk. Fig. 5 is a side elevation of that side of the caster and connections of Fig. 4 which is on the right-hand side in said Fig. 4, with this difference, that in Fig. 5 the whole of the vertical portion of the cleat or clamp is shown, whereas in Fig. 4 the upper portion is broken off. Fig. 6 represents the bottom of a modified form of my caster, but retains certain features of the invention shown in the first caster. Fig. 7 represents on a diminished scale a vertical central section of the box or case, and of a connecting cleat or clamp, and illustrating certain features of my invention, the section being taken at the dotted line $x\,x$, Fig. 3.

The device consists, essentially, of a caster-wheel mounted on a plate having a central pivotal bearing, $C'$. The said bearing is provided with arms C C, which extend horizontally, and the said plate is provided with bearings or lugs $a$. The caster-wheel or main roller B rotates between these bearings $a$ and the spindle or axial pin $a'$, on which or with which the roller B turns, and is supported by said lugs or bearings $a$. This pin may turn with the roller, but is preferably fixed in the bearings $a$ at or near the extremities of each arm C. Two friction-rollers, D, are present. One of these rollers D is connected to one of the arms C at or near the outer end of the latter by means of a pivot or spindle, $D'$. The other of these rollers D is connected to the other of the arms C at or near the end of said arm by means of a pivot or spindle, $D'$. The opening in the arm or extension thereof in which the friction-roller D is located is denominated $C^2$. Each friction-roller D may be rigidly fixed to its pivot or spindle $D'$ and turn with said pivot, the latter being suitably journaled in its arm C; but the pivot D is preferably fixed rigidly to the arm, and the roller D turns around on said pivot $D'$. The friction-rollers are preferably small, and rest upon the bottom or base A, or upon a raised ring or elevation projecting from the base. The axis of each friction-wheel is substantially coincident with a radius of the central bearing, $C'$, which carries said friction-wheel. The axis of caster-wheel B is substantially at right angles to a radius of the central bearing, $C'$. The central bearing, $C'$, is of any suitable form. For illustration, it may be a pivot journaled at one end to the base A or a projection therefrom. Preferably it is of the form of a perforated shank or sleeve, or hub, or hollow cylinder, $C^4$, as shown, (see more particularly Fig. 3,) and receives within it a hollow journal or cylinder, $C^5$, cast to or otherwise rigidly attached to the base A. A stationary bolt, $b^4$, passes through the hollow bearing $C^5$, and is provided with a head or a nut, said head overlapping the lower end of hub $C^4$ and preventing the latter from slipping off hollow bearing $C^5$. On this pivot-bolt turns the hub $C^4$ and its arms C with the caster-wheel B and friction-roller D.

When desired, a plate or disk, E, may be added and connected to the central bearing, C', and is rotatable. Preferably, where the hub C⁴ is present, the disk is rigidly connected to the said hub, being usually formed in one piece therewith. The arms C and sleeve and disk are usually formed in one piece. This plate to some extent shields the friction-rollers and their track from dust, dirt, &c. The disk E may be half-way down the hub or bearing, thereby enabling the caster to be better balanced, and imparting to it an easy and steady movement in and on its bearings.

The base A is preferably provided with a vertical wall or side, F. This wall may be of any desired depth. Usually it reaches to the disk E, but may reach farther down, so as to extend down below the plane of said disk. This side or wall F, in connection with the base A, forms a case or box, G. The base (with the walls where present) may be secured to the trunk in any suitable manner, a very suitable mode being the lugs or ears M, (see Fig. 6,) secured to and extending laterally from base A, bolts, screws, or rivets being usually passed through each ear M and into some part of the trunk. On the bottom of the trunk several narrow flat pieces of wood are usually secured, technically known as "trunk-bottom strips." One of the common forms of such strips (marked H) is shown in the drawings. As the trunk-strip is usually the lowest point of the trunk, it forms a desirable place at which to locate the caster-wheel. When the caster has a case or box, the latter is usually secured to the trunk-strip by being fastened from below, or preferably by setting the same in a recess in said trunk-strip, substantially as shown in Fig. 4. Where the base of the caster is without wall, or has a wall substantially as in Fig. 6, the caster may be inserted into the strip from above before the strip is connected to the trunk. The trunk-strip thus receives any lateral strain to which the base of the caster may be subjected, and effectually prevents lateral movement thereof. A flange, $f$, extends laterally from the lower edge of wall F.

As a means of securing the caster-box not only to the strip, but also to the bottom of the trunk, the flange may at one or more sides be continued in an upward projection or flange, $f^2$, against the side or end of the trunk-strip, and still further continued in a lateral flange, $f^3$, lying against the trunk-bottom. Screws, bolts, or rivets passed through the flanges $f^3$ and into the trunk may be used to hold the box to the trunk. When the flanges $f^3$ are present, the securing screws, bolts, or rivets usually to be employed at some point or points on the base or its extensions are preferably placed in the said flanges $f^3$. When desired, the flanges $f^3$ may be connected directly to the base, substantially as shown in Fig. 7. When the caster-box has flange or flanges $f^3$ $f^2$ and wall F, the flange $f^3$, flange $f^2$, and flange $f$ may be in one piece, the base A and wall F being separate from said flanges, the inner edge of flange $f$ preferably overlapping the lower edge of wall F.

In the drawings a very useful mode of uniting (when desired) the caster, trunk-strip, and side of the trunk is shown, and consists in uniting a vertical cleat or clamp, K, to the flange $f^2$ directly, as shown in Fig. 4 in dotted lines, or to the free end of a flange, as $f^3$, as shown in Fig. 7, nailed, screwed, bolted, riveted, or otherwise secured to the side of the trunk. When the cleat or piece K is used in connection with a caster-box having flanges $f^2$ and $f$ and wall F, with or without flange $f^3$, the piece K, flange $f^2$, and flange $f$ may be in one piece, the box and wall F being separate from the said parts, the inner edge of flange $f$ preferably overlapping the lower edge of wall F. This caster-box, flange $f^3$, and cleat or clamp K are preferably all rigidly united together, and usually cast or stamped in one piece of metal, which is a very advantageous mode of connecting together the caster, trunk-strip, and trunk, and also forms a strong clamp, and one which protects the strip itself.

The mode of operation is at once apparent. The main pressure transmitted through the caster falls upon the friction-rollers D, which are almost immediately over the bearings of the roller B. Some of the weight falls upon the central bearing, but, in fact, very little, so that there is almost nothing to interfere with its functions of rotation. This is an immense advantage over the common caster, in which the whole weight being supported on central bearing greatly interferes with its rotation. In my device, however, the weight is divided between the three places—part on the central bearing and part on the two friction-rollers.

Among the various advantages arising from the employment of certain features of my invention may be mentioned the following: Each of the flanges $f^2$ (or flange $f^2$ on one side and flange K on the other side) bears against its respective adjacent side of the trunk-strip, and the latter is embraced between them, and is thus prevented from splitting. The wood of the strip being present at each side of the box between the box and its adjacent flanges $f^2$ (or flange $f^2$ and flange K) allows the strip to be continued without piecing.

The various features of my invention are preferably employed together; but one or more of said features may be employed without the remainder. In so far as applicable, one or more of said features may be employed in connection with casters, or parts or connections, or supports thereof different from these herein particularly specified.

What I claim as new and of my invention, and desire to secure by Letters Patent, is—

1. The caster-wheel and friction-rollers D D, arms C C, central bearing-base, A, plate E, and the caster-wheel having its axis below the plate E, and the friction-rollers D D having their axes above the plate, substantially as and for the purposes set forth.

2. The combination of the trunk-strip H and the caster-box provided at each side with flanges $f$ and $f^2$, each of the flanges $f^2$ resting against its respective side of the trunk-strip, the trunk-strip being embraced between these flanges $f^2$, and the wood of the trunk-strip filling the space between the box and the flange $f^2$ adjacent thereto, substantially as and for the purposes set forth.

3. In a caster, the combination of base-plate A, wall F, connected to and exteriorly bounding the said plate, and flanges $f$, $f^2$, and $f^3$, substantially as and for the purposes set forth.

4. In a caster, the combination of the base-plate A, wall F, flanges $f$, $f^2$, and $f^3$, and the vertical cleat K, being an extension of flange $f^3$, extending up the side of the trunk and secured thereto, substantially as and for the purposes set forth.

NATHAN DRUCKER.

Witnesses:
    JNO. W. STREHLI,
    O. M. HILL.